(12) United States Patent
Savage (10) Patent No.: US 8,358,220 B2
(45) Date of Patent: Jan. 22, 2013

(54) WELLBORE COMMUNICATION, DOWNHOLE MODULE, AND METHOD FOR COMMUNICATING

(75) Inventor: William Mountjoy Savage, Houston, TX (US)

(73) Assignee: Shell Oil Company, Houston, TX (US)

(*) Notice: Subject to any disclaimer, the term of this patent is extended or adjusted under 35 U.S.C. 154(b) by 465 days.

(21) Appl. No.: 12/532,855

(22) PCT Filed: Mar. 26, 2008

(86) PCT No.: PCT/US2008/058191
§ 371 (c)(1),
(2), (4) Date: Mar. 29, 2010

(87) PCT Pub. No.: WO2008/118931
PCT Pub. Date: Oct. 2, 2008

(65) Prior Publication Data
US 2010/0194584 A1  Aug. 5, 2010

Related U.S. Application Data (60) Provisional application No. 60/908,274, filed on Mar. 27, 2007.

(51) Int. Cl.
*G01V 3/00* (2006.01)
(52) U.S. Cl. .................... 340/853.1; 340/853.2
(58) Field of Classification Search ............... 340/853.1, 340/853.2, 853.3; 370/235
See application file for complete search history.

(56) References Cited

U.S. PATENT DOCUMENTS

| | | | |
|---|---|---|---|
| 4,468,665 A | 8/1984 | Thawley et al. | 340/856 |
| 4,578,675 A | 3/1986 | MacLeod | 340/855 |
| 4,586,182 A | 4/1986 | Gallager | 371/30 |
| 4,648,057 A | 3/1987 | Wagstaff et al. | 364/726 |
| 4,648,471 A | 3/1987 | Bordon | 175/4.55 |
| 4,700,349 A | 10/1987 | Gallager | 371/30 |
| 4,739,325 A | 4/1988 | MacLeod | 340/854 |
| 4,755,998 A | 7/1988 | Gallager | 371/30 |
| 4,811,346 A | 3/1989 | Battail | 371/43 |
| 4,839,644 A | 6/1989 | Safinya et al. | 340/854 |
| 5,130,706 A | 7/1992 | Steenwyk | 340/854.6 |
| 5,406,570 A | 4/1995 | Berrou et al. | 371/43 |
| 5,446,747 A | 8/1995 | Berrou | 371/45 |
| 5,467,083 A | 11/1995 | McDonald | 340/854.6 |
| 5,493,288 A | 2/1996 | Henneuse | 340/854.4 |
| 5,563,897 A | 10/1996 | Pyndiah et al. | 371/37.4 |

(Continued)

FOREIGN PATENT DOCUMENTS

EP   0617196   9/1994

(Continued)

OTHER PUBLICATIONS

Oscar A. Takeshita, et al., Concatenated Codes that Achieve 10-6 Frame Error Rates at SNR's 06dB from the Sphere Packing Bound; Closing in on the Perfect Code IEEE Spectrum; Mar. 2004.

(Continued)

*Primary Examiner* — Peguy Jean Pierre (57) ABSTRACT

A wellbore communications system comprising a surface computing unit. The surface computing unit comprises a processing module and a communications module, one or more downhole modules arranged within the wellbore, and a wireless communications channel communicatively coupling one or more the downhole modules and the surface computing unit. The surface computer unit and one or more of the downhole modules are configured to encode data with an iterative code prior to transmission on the wireless communications channel.

9 Claims, 6 Drawing Sheets

U.S. PATENT DOCUMENTS

| | | | | |
|---|---|---|---|---|
| 5,574,374 | A | 11/1996 | Thompson et al. | 324/338 |
| 5,576,703 | A | 11/1996 | MacLeod et al. | 340/854.4 |
| 5,883,516 | A | 3/1999 | Steenwyk et al. | 324/366 |
| 5,887,657 | A | 3/1999 | Bussear et al. | 166/336 |
| 6,108,388 | A | 8/2000 | Douillard et al. | 375/348 |
| 6,119,264 | A | 9/2000 | Berrou et al. | 714/786 |
| 6,131,694 | A | 10/2000 | Robbins et al. | 181/105 |
| 6,382,332 | B1 | 5/2002 | Eaton | 175/50 |
| 6,424,595 | B1 | 7/2002 | Chenin | 367/82 |
| 6,580,751 | B1 | 6/2003 | Gardner et al. | 375/222 |
| 6,633,236 | B2 | 10/2003 | Vinegar et al. | 340/854.4 |
| 6,633,856 | B2 | 10/2003 | Richardson et al. | 706/15 |
| 6,662,338 | B1 | 12/2003 | Rezzi et al. | 714/795 |
| 6,715,550 | B2 | 4/2004 | Vinegar et al. | 166/250.15 |
| 6,718,502 | B1 | 4/2004 | Kuznetsov et al. | 714/755 |
| 6,789,227 | B2 | 9/2004 | De Souza et al. | 714/804 |
| 7,073,594 | B2 | 7/2006 | Stegemeier et al. | 166/369 |
| 7,114,561 | B2 | 10/2006 | Vinegar et al. | 166/250.01 |
| 7,477,161 | B2 * | 1/2009 | Macpherson et al. | 340/853.3 |
| 7,798,214 | B2 * | 9/2010 | Schmitt et al. | 166/250.01 |
| 2002/0042016 | A1 | 4/2002 | Yoon et al. | 430/270.1 |
| 2004/0221223 | A1 | 11/2004 | Yu et al. | 714/800 |
| 2004/0257241 | A1 * | 12/2004 | Menger | 340/854.3 |
| 2004/0263350 | A1 | 12/2004 | Vinegar et al. | 340/854.4 |
| 2005/0092487 | A1 | 5/2005 | Banning et al. | 166/254.1 |
| 2005/0104743 | A1 | 5/2005 | Ripolone et al. | 340/855.1 |
| 2007/0147251 | A1 * | 6/2007 | Monsen | 370/235 |
| 2008/0042869 | A1 * | 2/2008 | Zimmerman | 340/853.2 |

FOREIGN PATENT DOCUMENTS

WO      WO0155554      8/2001

OTHER PUBLICATIONS

G. gen: G. vdsl: G.dmt.bis: G.lite.bis: Turbo Codes 2000, ITU-Telecommunication Standardization Sector, Study Group 15; http://www.vocal.com; Jan. 12, 2001.
Chip Fleming, "A Tutorial on Convolutional Coding with Viterbi Decoding"; 1999-2003 Spectrum Applications; http://home.netcome.com/chip.f/viteri/tutorial.html; updated Jan. 31, 2003; printed Oct. 12, 2004.
Simulation source Code Examples; http://home.netcome/com//chip.f/viterbi/examples.html; Oct. 12, 2004.
Simulation Source Code Examples; http://home.netcome//chip.f/viterbi/algrthms.html; Oct. 12, 2004.
Description of the Algorithms; http://home.netcom.com//chip.f/viterbi/algrthms.html; Oct. 12, 2004.
Daniel J. Costello, Jr., et al., "A Comparison of Low Complexity Turbo-like Codes"; Dept of Elce. Eng., Univ. of Notre Dame, Notre Dame, Indiana.
Jiali He, et al., "On the Application of Turbo Codes to the Robust Transmission of Compressed Images", Dept. of Elec Eng., Univ. of Notre Dame, Notre Dame, Indiana.
Communications Systems Analysis: Turbo Codes, Telecommunications and Mission Operations Directorate-DSN Technology Program; http://www331.jpl.nasa.gov/public/TurboForce.gip, printed Feb. 24, 2005.
Dr. Sorin Adrian Barbulescu "What a Wonderful Turbo World"; version 1.2, ISBN 0-9580520-0-x, 2004.
Samuel J. MacMullan et al"; Comparison of Known Codes, Random Codes, and the Best Codes" IEEE Transactions on Information Theory; vol. 44, No. 7, Nov. 1998.
The Viterbi Algorithm, http://lcmwww.epfl.ch/APPLETS/VITERBI/decoding. html; Oct. 12, 2004 "Convolutional Coding", http://lcmwww.epfl.ch/APPLETS/VITERBI/coding. html, Oct. 12, 2004.
"Creating and Decoding Convolutional Codes: Error-control Coding; (Communications Toolbox)"; http://www.mathworks.com/access/helpdesk/help/toolbox/comm/fp7752dup3.html; Oct. 2004.
"Trellis Description of a Convolutional Encoder: Error-Control coding (Communications Toolbox)"; http://www.mathworks.com/access/helpdesk/help/toolbox/comm/fp7566.html; Oct. 12, 2004.
Polynomial Description of a Convolutional Encoder; Oct. 12, 2004.
Convolutional Coding Features of the Toolbox; Oct. 12, 2004.
Convolutional Coding: Error-Control Coding; Oct. 12, 2004.
"Commercially Available Turbo Code Products"; http://www331.jpl.nasa.gov/public/commericalTurbo.html, Oct. 12, 2004.
"JPL Turbo Decoder", http://www331.jpl.nasa.gov/public/TurboDecoder.html; Oct. 12, 2004.
"DVB-RCS Turbo decoder TC1000, Turbo Concept, 115 rue Claude Chappe, 29280 Plouzane, France" ; http://www.turboconcept.com/pp./prod datapag.html, Sep. 8, 2003, Oct. 12, 2004.
"Small World Communications—Products"; http://www.sworld.com.au/products/index.html, Oct. 12, 2004.
"PCDO4C—Small World Communications—Products"; http://www.sworld.com.au/products/pcd03v.html, Oct. 12, 2004.
Interleaver; Technology, Communications Research Center, Canada, http://www.crc.ca/en/html/fec/home/interleaver/interleaver, Oct. 12, 2004.
"SISO Decoders for Turbo Product Codes and Linear Block Codes", http://www.crc.ca/en/html/fec/home/siso/siso Oct. 12, 2004.
"Communications Research Center", http://www.crc.ca/en/html/crd/home/home, Oct. 12, 2004.
"8-State Turbo Codecs",http://www.crc.ca.en/html/fec/home/eightstate/eightstate, Oct. 12, 2004.
"Efficient Channel Coding Inc.," http://www.eccincorp.com/flash-home. html, Oct. 12, 2004.
"Comtech AHA—Hardware and IP core solutions for Lossless; Data Compression, Turbo Product Codes" http://www.aha.com/ Oct. 12, 2004.
"Turbo Product Codes" http://www.aha.com/show_prod_type.php?id+1 Oct. 12, 2004; "Low Density Parity Check Codes"; http://www.aha.com/show_prod_typephp?lp=8 Oct. 12, 2004.
Claudeberroe et al, "Near Shannon Limit Erro—Correcting Coding and Decoding : Turbo-codes (1)", IEEE Jan. 1993.
"Some Basics on Block Turbo Code"; http://www.sc.enst-bretagne.fr/btc.html Feb. 24, 2005.
"CCSR—Multimedia and DSP Research Group—Current Projects—Channel Coding"; http://www.ee.surrey.ac.uk/CCSR/Multimedia/Projects/Channel/ Oct. 12, 2004; Feb. 24, 2005.

* cited by examiner

WELLBORE COMMUNICATION, DOWNHOLE MODULE, AND METHOD FOR COMMUNICATING

PRIORITY CLAIM

The present application claims priority from PCT/US2008/058191, filed 26 Mar. 2008, which claims priority from U.S. Provisional Application 60/908,274 filed 27 Mar. 2007.

FIELD OF INVENTION

The present invention relates to a wellbore communications system using turbo code, a downhole module, and a method for communicating with the downhole module using iterative coding.

BACKGROUND

Oilfield technology has increasingly undergone a movement towards "instrumenting" the oilfield. This movement has included the placing of electronics, sensors, and/or controllable valves downhole along an oil production tubing string. Measuring while drilling has been developed to enable, among other things, more accurate drilling and well placement. Known means of communicating information from the subsurface to the surface are often insufficient to transfer the volume of data that would be necessary for useful downhole seismic data applications. Additionally known methods have allowed successful communication at low data rates but are of limited usefulness as a communication scheme where high data rates are required or it is undesirable to have complex mud pulse telemetry equipment downhole.

U.S. Pat. No. 6,580,751 (hereby incorporated by reference in its entirety) describes a method and apparatus for high speed digital data communications with multiple downhole modems connected to a surface modem by twisted pair cables. The method and apparatus utilize forward error correction; however there is an opportunity to optimize or improve the error correction coding. Such devices typically use an internal or external cable along the tubing string to provide power and communications downhole. It is undesirable and in practice difficult to use a cable along the tubing string either integral to the tubing string or spaced in the annulus between the tubing string and the casing. The use of a cable presents difficulties for well operators while assembling and inserting the tubing string into a borehole. Additionally, the cable is subjected to corrosion and heavy wear due to movement of the tubing string within the borehole.

While several "wireless" systems known, these systems suffer from bandwidth limitations. Such bandwidth limitations often require processing raw data downhole and only sending processed results to the surface. Such an approach presents several shortcomings. By only receiving the processed data, surface computers cannot confirm the validity of the raw data or perform other processing operations on the data. The latter shortcoming becomes magnified when it is considered that a typical well will remain in operation for several years during which time new or better data analysis techniques may develop.

Claude Shannon, in 1948, put forth a theory that an absolute maximum capacity, in bits per second, exists for communications channel at a given power level at the transmitter. According to Shannon's theory, with the right error-correction codes, data could be transmitted at speeds up the channel capacity, virtually free from errors. With increases in computational capacities, codes were developed prior to about 1993 that could be useful at ratios of signal to noise levels on a logarithmic scale of about 3.5 dB. In 1993, Claude Berrou, Alain Glavieux, and Punya Thitimajshima presented a paper at the IEEE International Conference on Communications in Geneva, Switzerland (C. Berrou, A. Glavieux, P. Thitimajshima, "Near Shannon limit error-correcting coding and decoding: Turbo-Code," (Proc. of IEEE ICC '93, Geneva, pp. 1064-1070, Volume 2, May 1993 © 1993 IEEE) describing a code that could reach within 0.5 db of Shannon's limit known as a turbo code. Turbo codes are typically parallel-concatenated convolutional codes with internal interleaving. An exemplary turbo-encoder is presented below. Turbo codes are described in, for example, U.S. Pat. Nos. 5,563,897, 5,406,570, and 6,108,388. The term "turbo code" is used to also include so-called "turbo-like" codes, which utilize a serial concatenation of convolutional codes and exhibit similar characteristics to turbo codes utilizing parallel concatenation.

Turbo codes are part of a class of codes known as iterative codes, so-called because decoding of the encoded signal is accomplished using an iterative process in which the error rate of the signal is reduced through each iteration. Another coding system that utilizes iterative coding and has been shown to approach Turbo code performance are low density parity check codes ("LDPC"). Such codes have been around since the early 1960s, but have been developed rapidly since benefits of the iterative decoding processes of the turbo codes have been demonstrated. LDPC codes are described in, for example, U.S. Pat. No. 6,633,856. Other classes of iterative codes include, but are not limited to, interference cancellation (IC) codes, serial interference cancellation (SIC) codes, and parallel interference cancellation (PIC) code.

SUMMARY OF THE INVENTION

The present invention includes a wellbore communications system comprising a surface computing unit comprising a processing module and a communications module; one or more downhole modules arranged within said wellbore; and a wireless communications channel communicatively coupling said one or more downhole modules and said surface computing unit; wherein said surface computer unit and said one or more downhole modules are configured to encode data with an iterative code prior to transmission on said wireless communications channel.

The present invention also includes a downhole module arranged within a wellbore of a petroleum well comprising a sensor; a communications and control module coupled to said sensor comprising a processor and a modem, said communications and control module configured to receive data from said sensor, encode said data with a iterative code, spread-spectrum modulate said encoded data, and transmit said spread-spectrum modulated encoded data over a wireless communications channel within said wellbore.

The present invention also includes a method for communicating between one or more remote computer units and a downhole module arranged within a wellbore extending from the surface of a petroleum well, said wellbore containing production tubing, said method comprising producing, at said downhole module, data for transmission; encoding said data using an iterative code; spread-spectrum modulating said data for transmission; and transmitting said spread-spectrum modulated encoded data on a communications channel arranged in said wellbore.

The present invention also includes a method for communicating with a downhole module arranged within a wellbore of a petroleum well, said petroleum well having a surface computer unit, said method comprising generating, at said surface computer unit, data for said downhole module; encoding said data using an iterative code; spread-spectrum modulating said data for transmission; and transmitting said spread-spectrum modulated encoded data on a communications channel arranged in said wellbore.

BRIEF DESCRIPTION OF THE DRAWINGS

The present invention is better understood by reading the following description of non-limiting embodiments with reference to the attached drawings, wherein like parts of each of the figures are identified by the same reference characters, and which are briefly described as follows.

DETAILED DESCRIPTION

Throughout the application, the use of the term "turbo code" is used to refer to parallel-concatenated convolutional codes with internal interleaving. The term "turbo code" is used to also include so-called "turbo-like" codes, which utilize a serial concatenation of convolutional codes and exhibit similar characteristics to turbo codes utilizing parallel concatenation.

The term "iterative code" is used to refer to a class of codes in which decoding of the encoded signal is accomplished using an iterative process in which the error rate of the signal is reduced through each iteration.

The term "spread-spectrum modulation" is used to refer to a telecommunications technique in which a transmitted signal is spread out across a bandwidth range considerably greater than the frequency of the original information. Spread-spectrum signals are resistant to noise at a specific frequency because the signal is spread over a large frequency band, producing a small amount of signal energy at each frequency.

The term "wireless" as used in this application means the absence of a conventional, insulated wire conductor, e.g., extending from a downhole device to the surface. Using the tubing and/or casing as a conductor is considered "wireless."

The term "modem" as used herein is not limited to conventional computer modems that convert digital signals to analog signals and vice versa (e.g., to send digital data signals over the analog Public Switched Telephone Network).

The term "sensor" as used herein includes any device that detects, determines, monitors, records, or otherwise senses the absolute value of or a change in a physical quantity or gathers data of any kind. Sensors as described in the present application can be used to measure, among others, temperature, pressure (both absolute and differential), flow rate, seismic data, acoustic data, pH level, salinity levels, valve positions, or almost any other physical data.

Referring now to the drawings, wherein like reference numbers are used to designate like elements throughout the various views, several embodiments of the present invention are further described. The figures are not necessarily drawn to scale, and in some instances the drawings have been exaggerated or simplified for illustrative purposes only. One of ordinary skill in the art will appreciate the many possible applications and variations of the present invention based on the following examples of possible embodiments of the present invention and cited patents and articles incorporated by reference.

As used in the present application, a piping structure can be one single pipe, a tubing string, a well casing, a pumping rod, a series of interconnected pipes, rods, rails, trusses, lattices, supports, a branch or lateral extension of a well, a network of interconnected pipes, or other structures known to one of ordinary skill in the art. The preferred embodiment makes use of the invention in the context of an oil well where the piping structure comprises tubular, metallic, electrically-conductive pipe or tubing strings, but the invention is not so limited. In a preferred embodiment, at least a portion of the piping structure needs to be electrically conductive. Such electrically conductive portion may be the entire piping structure (e.g., steel pipes, copper pipes) or a longitudinal extending electrically conductive portion combined with a longitudinally extending non-conductive portion. In other words, an electrically conductive piping structure is one that provides an electrical conducting path from a first location where a power source is electrically connected to a second location where a device and/or electrical return is electrically connected. The piping structure may be conventional round metal tubing, but the cross-section geometry of the piping structure, or any portion thereof, can vary in shape (e.g., round, rectangular, square, oval) and size (e.g., length, diameter, wall thickness) along any portion of the piping structure. Hence, a piping structure must have an electrically conductive portion extending from a first location of the piping structure to a second location of the piping structure.

Figure 1:
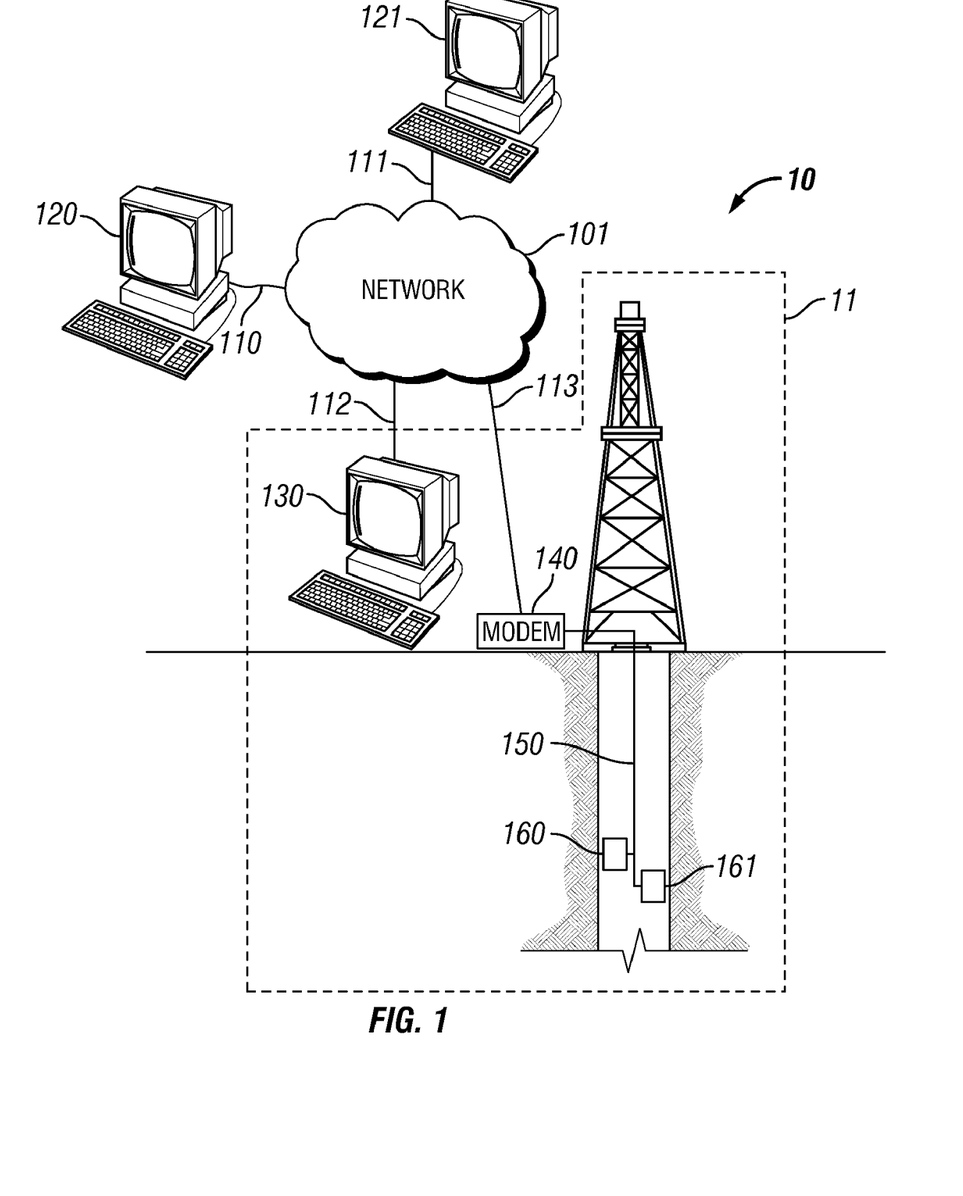
FIG. 1 illustrates a communications system according to one embodiment of the present invention.

FIG. 1 illustrates system 10 according to one embodiment of the present invention. System 10 includes remote units 120 and 121 connected to network 101 through communications links 110 and 111, respectively. It should be understood that while two remote units, 120 and 121, are illustrated in FIG. 1, any number of remote units may be used in conjunction with system 10. In one embodiment, downhole modules 160 and 161 may connect to network 101 through surface computer 130 such communications may travel from communications link 150 to modem 140 to a local link embodied as communications link 170 to surface computer 130 to communications link 112.

In a preferred embodiment, downhole modules 160 and 161 connect to network 101 directly through modem 140 and communications link 113. In this embodiment, surface computer 130 communicates with downhole modules 160 and 161 through network 101, just as remote units 120 and 121; that is, downhole modules 160 and 161 communicate with surface computer 130 through communications link 150, modem 140, communications link 113, network 101, and communication link 112 (thus, communications link 170 may be a local link or may represent the network path including communications link 113, network 101, and communications link 112). In such an embodiment, it should be understood that surface computer 130 may not be functionally distinguishable from remote units 120 and 121 and may, in fact, be located remote from petroleum well 11 such that remote unit 120 or 121 are interchangeable with surface computer 130. It should be understood that while two downhole modules, 160 and 161, are illustrated in FIG. 1, any number of downhole modules may be used in conjunction with system 10.

Communications links 110-113 may utilize any communications hardware and methods known in the art capable of transmitting data and may include phone lines, T1 lines, ISDN lines, or wireless links such as wireless links using the IEEE 802.11 standard. In some embodiments, communications links 110-113 may comprise multiple communications media and protocols.

In one embodiment of the invention, remote units 120 and 121, surface computer 130, and downhole modules 160 and 161 each serve as addressable nodes in a communications network utilizing a multilayer protocol, such as the Open Systems Interconnection (OSI) Model. Thus, communications between all components utilize the same higher layer protocols, while individual communication links (or portions thereof) may utilize various lower-layer protocols. In particular, lower layer protocols for communications link 150 are discussed in detail, below.

In some prior systems, downhole modules 160 and 161 did not function as addressable nodes. Rather, downhole modules 160 and 161 communicated exclusively with surface computer 130 through modem 140. Thus, from the point of view of remote units 120 or 121, downhole modules 160 and 161 were unreachable directly and could only be reached through surface computer 130. Such an arrangement was necessary since downhole modules 160 and 161 often communicated with surface computer 130 (through modem 140) in a manner completely divergent to the rest of the network, often limited by bandwidth and information type. It should be understood that in a preferred embodiment one or more downhole module will communicate over network 101 as described above, but other modules may continue to communicate only with surface computer 130. Thus, in one embodiment of the present invention, communications network 101 is extended downhole beyond surface computer 130.

As an analogy, a peripheral device may be directly attached to a computer by, for example, a serial cable. While that personal computer may be communicatively coupled to another remote personal computer by way of a network, the remote computer cannot send commands to or receive data from the peripheral device. At best, the remote computer may send a request to the local computer for information previously retrieved from the peripheral device stored on the local computer. However, if the network is extended to include the peripheral device the remote computer may directly address requests to and retrieve information from the scanner.

As discussed briefly above, downhole modules 160 and 161 may be integrated into network 101 by several methods. In one embodiment, modem 140 may serve as a router receiving packets sent by downhole modules 160 and 161 on communications link 150 and retransmitting the packets over communications link 113 to its intended receiver, such as remote unit 120. As will be discussed in detail below, this routing functionality may include translating the packets from one communication protocol to another. In another embodiment, surface computer 130 may receive all packets from downhole modules 160 and 161 through modem 140 and may process the packets for transmission on network 101. In one embodiment, a router (not shown) may reside between communications links 112 and 113 to coordinate communication between remote computer 130, modem 140, and network 101. For example, a packet received from remote unit 120 at the router addressed to downhole module 160 may be passed to surface computer 130 or modem 140 for processing.

Figure 2:
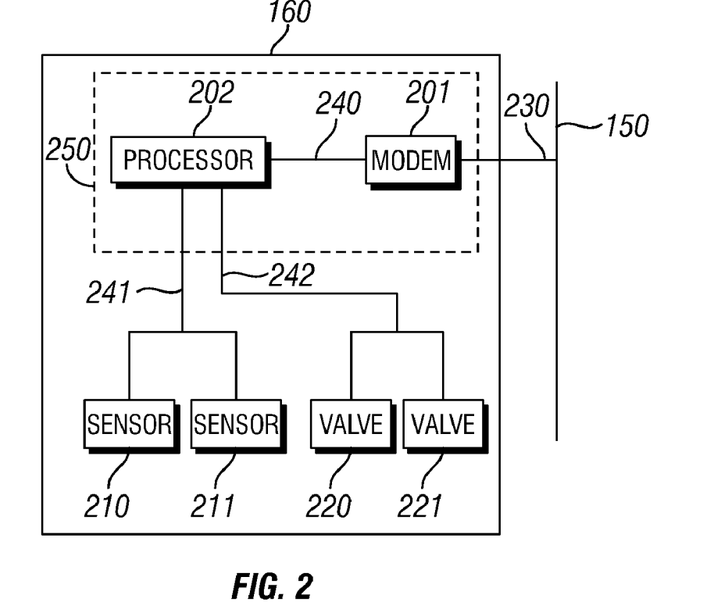
FIG. 2 illustrates a block diagram of an exemplary downhole module according to one embodiment of the invention.

Downhole modules such as downhole modules 160 and 161 may include any device that communicates with the surface either to transmit information gathered, receive commands, or both. A block diagram of an exemplary "mixed" (both transmitting and receiving data) downhole module 160, according to an embodiment of the invention, is illustrated in FIG. 2. Downhole module 160 includes a modem 201 connected to communications link 150 by communications link 230. Modem 201 is connected to processor 202 by communications link 240 which is in turn connected to sensors 210 and 211 by communications link 241 and valves 220 and 221 by communications link 242. Communications links 230 and 240-242 may utilize any communications hardware and methods known in the art capable of transmitting data and may include phone lines, T1 lines, ISDN lines, or wireless links such as wireless links using the IEEE 802.11 standard. In some embodiments a communication link may simply comprise a wire tracing on a circuit board. Communications link 230 is largely dependent on the nature of the physical channel of communications link 150.

Processor 202 and modem 201 may be collectively referred to as communications and control module 250. It should be understood that while downhole module 160 is illustrated with two sensors 210 and 211 and two valves 220 and 221, a downhole module may have any number of sensors and/or valves or any other device receiving information from or sending information to the surface. It should be understood that an exemplary downhole module may contain other components understood by those skilled in the art to be included in such systems, such as memory units, power connections, and accompanying circuitry and/or the like.

As an example, downhole module 160 may function to measure and regulate fluid flow (such a system is described in commonly-owned U.S. Pat. No. 7,073,594, which is hereby incorporated by reference in its entirety). Downhole module 160 may thus include two sensors 210 and 211 to measure fluid flow. The sensors 210 and 211 collect data and forwards that data to communications and control module 250 that may then forward the collected data to surface computer 130 for processing. Surface computer 130 may process the data and send an instruction for valve 220 and/or valve 221 based on that analysis. In some cases, processor 202 may directly analyze the data and instruct valve 220 and/or valve 221 based on that analysis. In one embodiment, communications and control module 250 may also communicate with remote unit 120.

In many current systems, insufficient bandwidth may exist to send the raw data gathered by sensors over communications link 150 to the surface (the bandwidth issue becomes more acute in the next example discussed below). In such a case, processor 202 often analyzes the raw data and sends up only the results. For example, processor 202 may receive a flow measurement value every second from sensor 210 and may compare the received value to a range. Processor 202 may only signal surface computer 130 if that value falls outside of a normal range. While surface computer 130 may find such information useful, the failure to transmit raw data results in many shortcomings. First, surface computer 130 (along with remote units 120 and 121 receiving data from surface computer 130) may not be able to observe trends in data, either in real time, or on a historical basis. Such trends may provide details into the workings of well 11. Additionally, a new analysis may not easily be implemented. For example, after analysis of data, it may be decided that the proper normal range should be altered. Such a change cannot easily be implemented in processor 202. Further, the raw data may be helpful in allowing surface computer 130 and/or remote units 120 or 121 to recalibrate a sensor or diagnose a failure.

Figure 3:
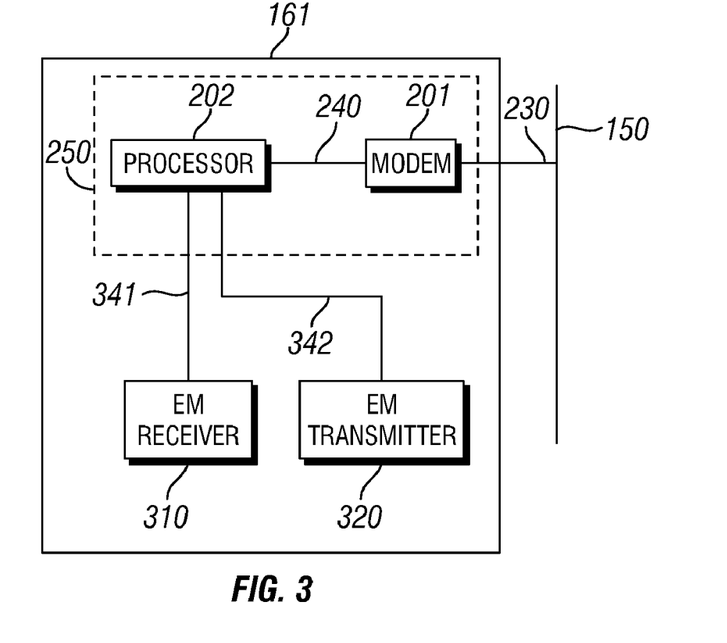
FIG. 3 illustrates a block diagram of another exemplary downhole module according to one embodiment of the invention.

In another example, as illustrated in FIG. 3, downhole module 161 functions as a formation modeling tool utilizing electromagnetic measuring tool (such a system is described more fully in commonly-owned U.S. Patent Application Publication No. 2005/0092487, which is hereby incorporated by reference in its entirety). Downhole module 161 may include EM transmitter 320 that transmits EM energy into the formation beyond the wellbore on command from processor 202. EM receiver 310 will then receive the reflected energy from the formation and transmit the received data to processor 202. In the embodiment described in U.S. Patent Application Publication No. 2005/0092487, the information is then transmitted by modem 201 to surface computer for processing by way of a cable (communications link 150). Such processing may be quite complicated and require a significant amount of processing power. In a system utilizing one of the "wireless" wellbore communication methods described, bandwidth limitations may prevent the transmission of raw data to the surface computer. In such a case, processor 202 may be forced to process the data, only sending the results up to surface computer 130. By utilizing the lower layer coding model described below, downhole module 161 may utilize a wireless communication method for communications link 150 and still transmit high rate data to surface computer 130 and/or remote units 120 and/or 121. In another embodiment, additional bandwidth may be used to send more frequent verification streams of data to verify that processing done downhole is accurate and to assist in the calibration process.

Figure 4A:
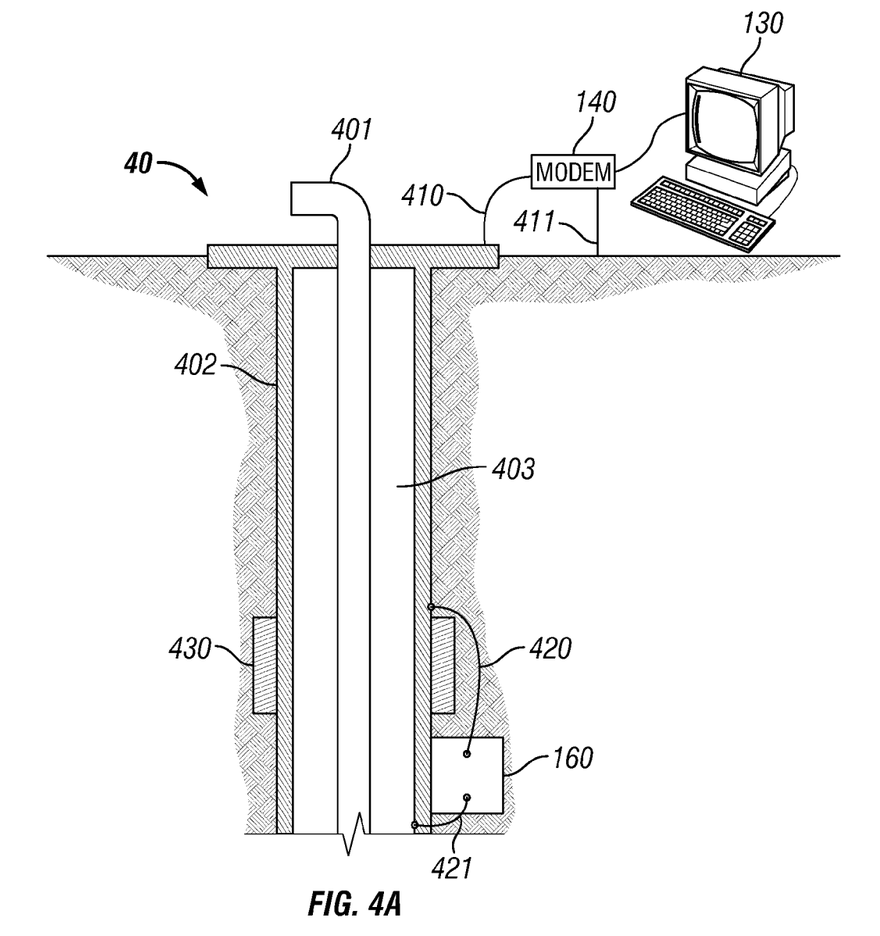
FIG. 4A illustrates a wireless wellbore communications system according to a preferred embodiment of the invention.

Any wellbore communications system may be used in conjunction with communications link 150. In a preferred embodiment, a wireless communications system is used. FIG. 4A illustrates a wireless communications system 40 according to a preferred embodiment (the embodiment of FIG. 4A is described more completely in commonly owned U.S. Pat. No. 7,114,561, which is hereby incorporated by reference in its entirety). System 40 includes tubing 401, casing 402, and annulus 403 between tubing 401 and casing 402. Modem 140 is electrically coupled to casing 402 by link 410 and to ground by link 411. Modem 140 may use an modulation technique known to those skilled in the art. In a preferred embodiment, modem 140 uses a spread-spectrum modulation technique. Modem 140 may serve as a master modem in an arrangement with slave modems included in each downhole module. System 40 further includes inductive choke 430 wrapped cylindrically around casing 402, which serves as an impedance source limiting current flow in both casing 402 and tubing 401 beyond the inductive choke 430. Downhole module 160 is located on the outside of casing 402 and may contain a number of sensors. Downhole module 160 is connected to casing 402 above inductive choke 430 by jumper 420 and below inductive choke 430 by jumper 421. Jumper 420 thus servers as a signal path while jumper 421 serves as a ground path. Downhole module 160 thus uses modem 201 (not shown) to communicate with modem 140 via wireless signaling traveling along casing 402. System 40 may include several other downhole modules, each with a modem 201 communicating with modem 140. Each modem 201 may also communicate with other modems 201 to allow for coordination and relaying of signals.

Figure 4B:
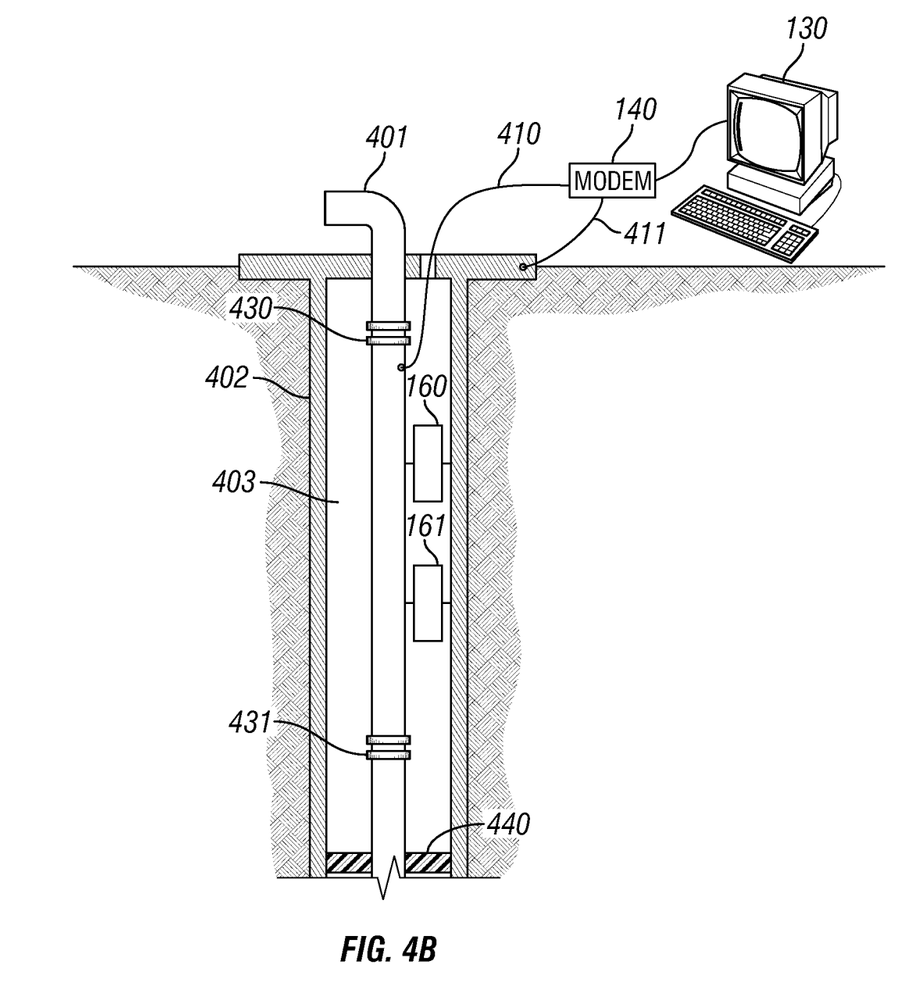
FIG. 4B illustrates a wireless wellbore communications system according to a preferred embodiment of the invention.

FIG. 4B illustrates a wireless communications system 40 according to a preferred embodiment (the embodiment of FIG. 4B is described more completely in commonly owned U.S. Pat. No. 6,715,550, which is hereby incorporated by reference in its entirety). System 40 includes tubing 401, casing 402, and annulus 403 between tubing 401 and casing 402. In the embodiment illustrated in FIG. 4B, a portion of tubing 401 is electrically isolated from casing 402 by inductive chock 430 and inductive choke 431 (tubing 401 and casing 402 are electronically coupled above inductive choke 430 at the surface and below inductive choke 431, but above the production zone, by packer 440). Modem 140 is electrically coupled to tubing 401 below inductive choke 430 by link 410 and to casing 402 by link 411. Casing 402 thus serves as a ground path. Modem 140 may use any modulation technique known to those skilled in the art. In a preferred embodiment, modem 140 uses a spread-spectrum modulation technique. Modem 140 may serve as a master modem in an arrangement with slave modems included in each downhole module. Downhole modules 160 and 161 are located in annulus 403. Downhole module 160 is connected to tubing 401 by a first jumper and to casing 402 by a second jumper. Tubing 401 thus serves as a signal path while casing 402 serves as a ground path. Downhole module 160 thus uses modem 201 (not shown) to communicate wirelessly with Modem 140 via wireless signaling traveling along casing 402. System 40 may include several other downhole modules, each with a modem 201 communicating with Modem 140. Each modem 201 may also communicate with each other in order to allow for coordination and relaying of signals.

Figure 5:
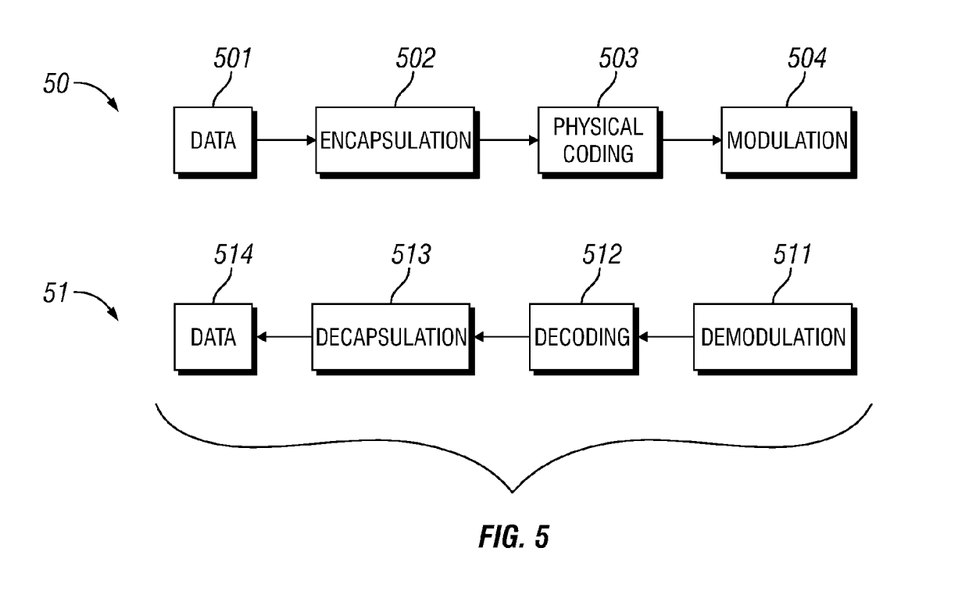
FIG. 5 illustrates an outgoing data processing flow chart and an incoming data processing flow chart according to a preferred embodiment of the invention.

Turning to FIG. 5, an outgoing data processing flow chart 50 and an incoming data processing flow chart 51 according to one embodiment of the invention are illustrated. The processing steps of flow chart 50 are performed both on the surface and at each downhole module. Processing at the surface may be performed partially in surface computer 130 and/or remote units 120 and/or 121 and partially in modem 140 or entirely in modem 140 (FIG. 1). Similarly, coding at each downhole module may be performed partially in processor 202 and partially in modem 201 or entirely in modem 201 (FIG. 2). Modem 201 may include separate or integrated hardware to implement one or more of the coding steps. It should be understood that while downhole modules 160 and 161 are used as examples in the following description, other downhole modules perform similar processing. Further, it should be understood that the processing steps listed are those necessary for transmission of data along communications link 150. While additional processing may be required for transmission on communications links 110-113, these processing steps are not addressed in detail.

In step 501, data is generated. It should be understood that data is used in a general sense such that data may be any information to be transmitted. As such, data may include, for example, collected information or control commands. For example, data may be generated by processor 202 in downhole module 161 in response to measurements reported by sensors 210 and 211. As another example, data may be a request for measurement results made generated in surface computer 130.

In step 502, the data is encapsulated within a communications protocol or, more specifically, the non-physical layers of a communication protocol suite (as physical layer processing will be discussed below). Any appropriate communications protocol may be used. It should further be understood that a protocol suite may not precisely fit the OSI or any other multilayer model; the protocol suite utilized must simply facilitate communications between downhole modules such as downhole module 160 and surface computer 130 and/or remote units 120 and 121 and thus may or may not be a standard protocol. As discussed above, data may be encapsulated at surface computer 130 and/or remote units 120 and 121 and upon reception at modem 140, the data may be decapsulated and re-encapsulated using a modified protocol for transmission to downhole module 160 or 161.

In a preferred embodiment, a modified IP protocol suite may be employed by modem 140 to facilitate downhole communication while remaining transparent to surface computer 130 and/or remote units 120 and/or 121 and downhole module 161. Data generated in step 501 may be consecutively encapsulated by each protocol layer from the application layer to the network layer (for example with the IP protocol) to the data link layer (physical layer processing is performed in steps 503 and 504) at surface computer 130 and/or remote units 120 and/or 121. Processing for each of these layers typically involves adding a header including address and other information. Such processing is well known to those skilled in the art. When modem 140 receives a packet from surface computer 130 and/or remote units 120 and/or 121 addressed to one of the downhole modules, the packet is modified for more efficient transmission downhole. In particular, the IP header may be removed in its entirety and the TCP header may be substituted with a modified TCP header containing less information. These changes reduce the packet size—and in particular the overhead portion of the packet—of packets traveling over communications link 150, thus increasing the bandwidth available for data transmission. Similarly, when modem 140 receives a packet from a downhole module addressed to surface computer 130 and/or remote units 120 and/or 121, modem 140 will restore the full protocol information to the packet, making the packet suitable for transmission over communications links 110-113.

In a preferred embodiment, downhole module 160 and surface computer 130 may communicate via the MODBUS communications protocol. In this protocol, modem 140 is designated as the master modem and each modem 201 is designated as a slave modem. As a brief aside, the MODBUS communications protocol predates the OSI model and the IP Protocol Suite and thus from an academic perspective a MODBUS data packet may be considered to reside entirely in the Application Layer. A MODBUS packet includes a request or response, an address, and information. This information may be interpreted by the Application Layer process in the receiving node. A MODBUS packet may be passed to the physical layer as-is, or may be encapsulated in a modified IP protocol packet. In one embodiment, sensor 210 and processor 202 may utilize the MODBUS architecture and modem 201 may encapsulate the MODBUS packet in a modified IP protocol packet. Such an arrangement allows the use of an existing sensor and processor while only modifying the data coding performed by modem 201. In other embodiments, other data protocols known to those skilled in the art such as Allen Bradley, OPC, DH-Plus, and/or the like may be utilized for communication by the sensors.

In one embodiment, petroleum well 11 may include one or more downhole modules such as downhole module 160 utilizing the MODBUS architecture and transmit MODBUS messages (which may or may not be encapsulated in a TCP/IP packet) and one or more downhole modules such as downhole module 161 utilizing the IP protocol suite or a modified version thereof. In such an embodiment, surface computer 130 and modem 140 must be capable of communicating using more than one protocol.

Figure 6:
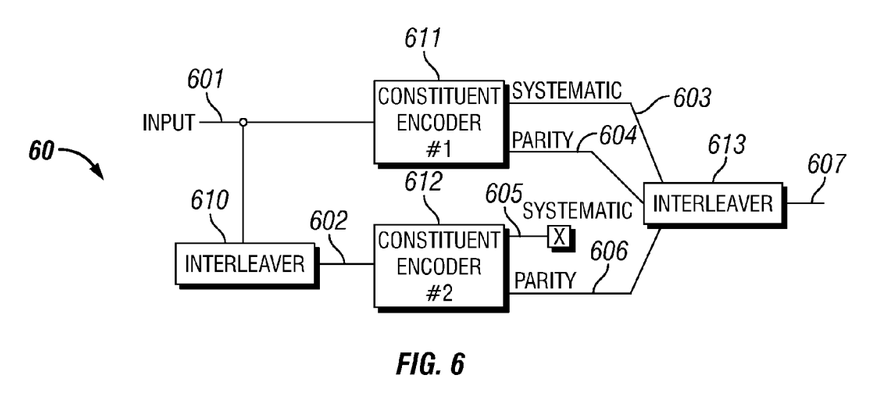
FIG. 6 illustrates a block diagram of an exemplary turbo encoder according to a preferred embodiment of the invention; and, FIG. 7 illustrates a block diagram of an exemplary turbo decoder according to a preferred embodiment of the invention.

In step 503, physical coding is applied to the encapsulated data. Physical coding may in some embodiments include the addition of Forward Error Correction (FEC) coding such that redundant data is added that allows the receiver to correct errors, reducing the instances in which a packet must be re-sent. In a preferred embodiment, turbo coding is employed. Turbo coding may be performed in software in processor 202 of downhole module 160 or surface computer 130 or may performed by modem 201 or 140. In one embodiment, modem 201 or 140 may include an application-specific integrated circuit (ASIC) to perform turbo coding. An exemplary turbo coder is illustrated in FIG. 6 and is described below. In another preferred embodiment, FEC coding may be achieved using another class of iterative codes, Low Density Parity Check (LDPC) codes. LDPC encoding and decoding schemes are known to those skilled in the art.

In step 504, the coded encapsulated data is modulated for transmission on communications link 150. In a preferred embodiment, the data is spread-spectrum modulated and then modulated on a carrier frequency. As is known to those skilled in the art, spread-spectrum signals are resistant to noise at a specific frequency because the signal is spread over a large frequency band, producing a small amount of signal energy at each frequency. In a preferred embodiment, a single PN sequence may be used to spread-spectrum modulate each packet transmitted from each modem 201 as well as modem 140. In another embodiment, different PN sequences may be applied based on the recipient. In such a case, the PN sequences would serve to channelize communications link 150. In another embodiment modem 140 may use a single PN sequence to transmit to all modems 201 and all modems 201 may use a separate single PN sequence to transmit to modem 140. Additionally, modem 140 may utilize one carrier frequency to transmit while each of modems 201 may utilize a second carrier frequency to transmit or a single carrier frequency may be used in both directions.

Figure 7:
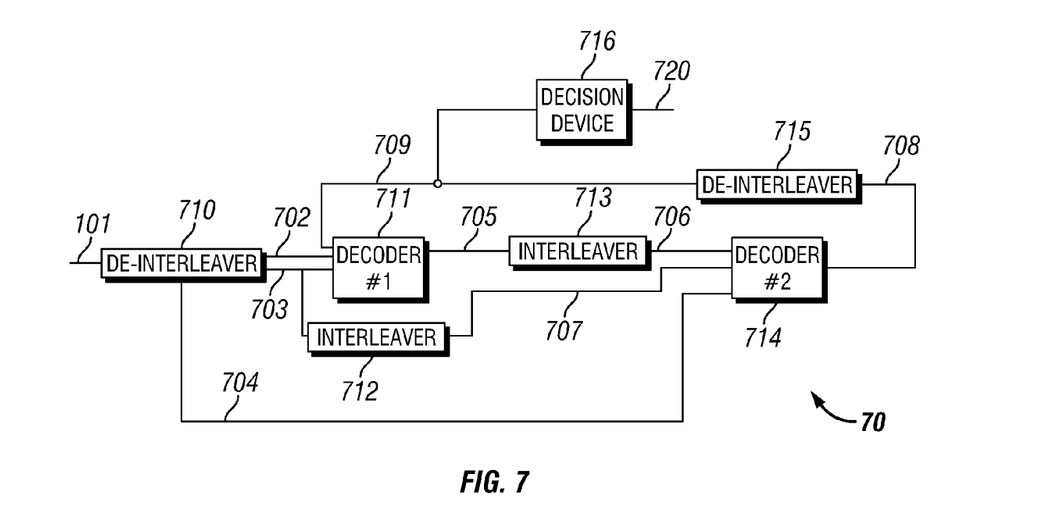

When a packet arrives at modem 140 or one of modems 201, the packet is processed in reverse order as it was constructed as illustrated in flow chart 51. Similar hardware and software may be used for corresponding encoding and decoding steps. For example, if downhole module 160 performs Data Link Layer encapsulation in processor 202, Data Link Layer decapsulation may similarly be performed in processor 202. In step 511, the packet is demodulated. If any channelization had been applied at the transmitting modem, only those packets on channels intended for the receiving modem need be demodulated. In step 512, the demodulated packet is decoded. In a preferred embodiment, step 512 includes turbo decoding or iterative decoding of other iterative FEC codes. FIG. 7, below, illustrates an exemplary turbo decoder. In step 513, the data is decapsulated. Finally, in step 514 the data may be utilized.

Turning to FIG. 6, a block diagram of an exemplary turbo encoder 60 is shown according to a preferred embodiment. Turbo encoder 60 includes two constituent encoders 611 and 612 as well as interleavers 610 and 613. In a preferred embodiment, constituent encoders 611 and 612 comprise recursive systematic convolution encoders, which are known to those skilled in the art. In a preferred embodiment, constituent encoders 611 and 612 are identical encoders, but produce different results as constituent encoder 611 operates on data stream 601—the input data—and constituent encoder 612 operates on data stream 602—the output of interleaver 610. Each constituent encoder produces two outputs—the original input bits (the systematic output) and parity bits. The systematic bits and parity bits of constituent encoder 611—data streams 603 and 604, respectively—as well as the parity bits of constituent encoder 612—data stream 606—are then combined at interleaver 613 to produce the turbo encoded sequence—data stream 607. Interleavers 610 and 613 need not be identical. In one embodiment, data streams 604 and 606 may be punctured before transmission such that not all of the generated parity bits are transmitted.

Turning to FIG. 7, a block diagram of an exemplary turbo decoder 70 is shown. The turbo coder is an iterative decoder that produces a more accurate response with each iteration. In a practical implementation, a tradeoff is made between the number of iterations and the improved signal quality gained by each iteration, as is known to those skilled in the art. Each decoder 711 and 714 accepts two sets of soft decision likelihood values—a first set from the previous iterations that is take as a priori information and a second set of soft values as originally received—and a set of parity bits. De-interleaver 710 receives input stream 701 and reverses the interleaving performed by interleaver 613 to create three data streams: the parity bits from data stream 604 as data stream 702, soft decision likelihood values of the information (systematic) bits from data stream 603 as data stream 703, and the parity bits from data stream 606 as data stream 704. Data streams 702 and 703 are then fed into decoder 711 to produce a new set of soft decision likelihood values as data stream 705. In successive iterations, decoder 711 will accept data stream 709—the de-interleaved output of decoder 714—as a priori information, as well.

De-interleaver 715 and interleavers 712 and 714 are designed to re-order the information bits based on the operation of interleaver 610 such that the bits are in the order received by constituent encoder 611 or 612. Thus, interleavers 712 and 713 function to interleave data stream 703 and 705 to form data streams 707 and 706, respectively, such that the data stream is ordered as it was when input to constituent encoder 612 and thus corresponds to that parity pits produced by constituent encoder 612 contained in data stream 704. Decoder 714 thereby accepts data streams 706, 707, and 704 to produce a new set of soft decision likelihood values as data stream 708. Data stream 708 is then fed to de-interleaver 715 which re-orders the bits to their original order to produce data stream 709. As discussed above, data stream 709 may be fed to decoder 711 to begin another iteration. When the specified number of iterations have been completed, decision device 716 processes the soft decision likelihood values to produce hard values that are output as data stream 720. As discussed above, turbo coder 60 and turbo decoder 70 are merely exemplary and any appropriate coder and decoder may be employed.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Those of skill in the art will appreciate that many modifications and variations are possible in terms of the disclosed embodiments, configurations, materials, and methods without departing from their spirit and scope. Accordingly, the scope of the claims appended hereafter and their functional equivalents should not be limited by particular embodiments described and illustrated herein, as these are merely exemplary in nature and elements described separately may be optionally combined.

The invention claimed is:

1. A wellbore communications system comprising:
   a surface computing unit comprising a processing module and a communications module;
   one or more downhole modules each having an IP address arranged within said wellbore;
   a wireless communications channel a comprising production tubing communicatively coupling said one or more downhole modules and said surface computing unit;
   wherein said surface computer unit and said one or more downhole modules are configured to encode data with an iterative turbo code prior to transmission on said wireless communications channel; and
   said surface corn unit and said one or more downhole modules are further configured to spread spectrum modulate said encoded data prior to transmission on said wireless communications channel utilizing a multilayer protocol.

2. The wellbore communications system of claim 1 wherein said iterative code is a low density parity check code.

3. The wellbore communications system claim 1 said processing module of said surface computer unit is located remote from said wellbore, said communications module of said surface computer unit is communicatively coupled to said wireless communications channel, and said processing module and communications module are communicatively coupled by a network.

4. A method for communicating between one or more remote computer units and a downhole module arranged within a wellbore extending from the surface of a petroleum well, said wellbore containing production tubing, said method comprising:
   producing, at said downhole module, data for transmission;
   encoding said data using an iterative code;
   spread-spectrum modulating said data for transmission; and,
   transmitting said spread-spectrum modulated encoded data on a communications channel arranged in said wellbore;
   further including utilizing communications module at the surface of said wellbore that is communicatively coupled to said one or more remote computing units by a network, comprising:
   receiving said communications module of said surface computing unit said spread spectrum modulated encoded data;
   spread-spectrum demodulating said received spread-spectrum modulated encoded data to recover said encoded data
   iteratively decoding said encoded data to recover said data;
   determining the intended recipient of said data; and
   retransmitting said data if said determined intended recipient is one or more of said one or more remote computing units.

5. The method of claim 4 wherein said transmitting said spread-spectrum modulated data on a communications channel arranged in said wellbore comprises:
   utilizing said production tubing as a wireless communications channel.

6. The method of claim 4 wherein said encoding said data using an iterative code comprises:
   encoding said data using a turbo code.

7. A method for communicating with a downhole module arranged within a wellbore of a petroleum well, said petroleum well having a surface computer unit, said method comprising:

generating, at said surface computer unit, data for said downhole module;

encoding said data using an iterative code;

spread-spectrum modulating said data for transmission; and, transmitting said spread-spectrum modulated encoded data on a communications channel arranged in said wellbore:

wherein said petroleum well is connected to a network having one or more remote units arranged remote petroleum well and wherein said generating, at said surface computer unit, data for said downhole module comprises:

receiving, over said network, at said surface computing unit a message from one of said one or more remote computing units;

determining if said message is addressed to said downhole module; and if said message is addressed to said downhole module, repackaging said message as data for said downhole module in a format readable by said downhole module.

8. The method of claim 7 wherein said wellbore includes production tubing and said transmitting said spread-spectrum modulated data on a communications channel arranged in said wellbore comprises:

utilizing said production tubing as a wireless communications channel.

9. The method of claim 7 wherein said encoding said data using an iterative code comprises:

encoding said data using a turbo code.

* * * * *